(12) United States Patent
Rohs et al.

(10) Patent No.: US 6,364,775 B1
(45) Date of Patent: Apr. 2, 2002

(54) TORSION VIBRATION DAMPER AND PROCESS FOR ITS MANUFACTURE

(75) Inventors: Ulrich Rohs; Hans Rohs, both of Düren; Dietmar Heidingsfeld, Aachen, all of (DE)

(73) Assignee: Rohs-Voigt Patentverwertungsgesellschaft mgH, Düren (DE)

( * ) Notice: Subject to any disclaimer, the term of this patent is extended or adjusted under 35 U.S.C. 154(b) by 0 days.

(21) Appl. No.: 09/296,714

(22) Filed: Apr. 22, 1999

(30) Foreign Application Priority Data

Apr. 22, 1998 (DE) .......................................... 198 17 910

(51) Int. Cl.[7] ................................................. F16D 3/12
(52) U.S. Cl. ........................ 464/66; 464/64; 192/205; 192/215
(58) Field of Search .............................. 464/62, 64, 66, 464/67, 68; 192/205, 212, 214

(56) References Cited

U.S. PATENT DOCUMENTS

| | | | |
|---|---|---|---|
| 5,088,964 A | * 2/1992 | Kuhne | 464/68 |
| 5,194,045 A | * 3/1993 | Hanke | 464/24 |
| 5,249,659 A | * 10/1993 | Fukushima | 192/70.17 |
| 5,459,916 A | 10/1995 | Jäckel et al. | |
| 5,551,318 A | 9/1996 | Fukushima | |
| 5,569,088 A | * 10/1996 | Schierling et al. | 464/64 |
| 5,575,182 A | 11/1996 | Schierling et al. | |
| 5,863,253 A | * 1/1999 | Rohs et al. | 464/66 |
| 5,916,025 A | * 6/1999 | Fenioux et al. | 464/67 |
| 6,110,046 A | * 8/2000 | Rohs et al. | 464/64 |

FOREIGN PATENT DOCUMENTS

| | | |
|---|---|---|
| DE | 3436012 | 4/1986 |
| DE | 3612370 | 10/1987 |
| DE | 3721712 | 1/1988 |
| DE | 3815505 | 12/1988 |
| DE | 3411092 | 8/1994 |
| DE | 4328153 | 2/1995 |
| DE | 19506157 | 8/1995 |
| DE | 19522718 | 1/1996 |
| DE | 4432625 | 5/1997 |
| DE | 197 10 918 | 9/1998 |
| EP | 0 427 983 | 5/1991 |

* cited by examiner

Primary Examiner—Lynne H. Browne
Assistant Examiner—Aaron Dunwoody
(74) Attorney, Agent, or Firm—Collard & Roe, P.C.

(57) ABSTRACT

A simplified torsion vibration damper having a primary plate and a secondary plate wherein the primary plate is manufactured from a primary plate which transfers a torque onto the secondary plate and the additional rim. The torque is transferred through springs to this secondary plate and additional rim which is connected via angled areas to the primary plate. A starter gear rim can be provided on the additional rim. In addition, a generating element plate with drill holes can be fitted at the primary plate and the additional mass which serves as a location-dependant motor control unit. The manufacturing process can be simplified even further through the proper arrangement of the secondary plate and the bearing sleeve.

31 Claims, 8 Drawing Sheets

TORSION VIBRATION DAMPER AND PROCESS FOR ITS MANUFACTURE

BACKGROUND OF THE INVENTION

Field of the Invention

The invention relates to a torsion vibration damper with a primary plate and a secondary plate. The invention likewise relates to a process for the manufacture of this type of torsion vibration damper. Such torsion vibration dampers are frequently used in particular with clutches.

SUMMARY OF THE INVENTION

The object of the invention is to provide a new type of torsion vibration damper which can be manufactured with consistent improved quality, more simply, and therefore more economically. The new design will achieve greater flexibility and adaptability of the torsion vibration damper to suit individual customer requirements.

As a solution, the invention is a torsion vibration damper with a primary plate and a secondary plate. The primary plate encompasses a primary plate, which transfers a torque movement from the primary plate to the secondary plate. The use of a plate for the transfer of the torque guarantees simple manufacture of this module, since recourse need only be made to the machining processes necessary for such plates. In particular, it is also possible to create such a plate so that metal-removing machining is not required.

The torque transfer function of the primary plate makes it possible to do without other modules such as webs, levers, etc., for transferring the torque. The primary plate can be formed so that it can adopt the entire torque-transferring function. In particular, the primary plate can have at least one support area with a surface running perpendicular to the direction of rotation of the torsion vibration damper. This area is created by the forming of the primary plate. By means of such a support area, however it may be designed in specific terms. Forces can be transferred in the peripheral direction from the primary plate. This can be achieved to advantage, by means of a spring arrangement encompassing thrust pistons and springs, arranged between the primary and secondary plates. This then makes it possible to do without additional modules which form such support areas.

The primary plate is formed as a module symmetrical to the main axis of rotation of the torsion vibration damper. This may involve rotational, axial, or mirror symmetry. An arrangement such as this inherently increases the stability of the primary plate, and, guarantees the simple manufacture of the torsion vibration damper. This result in turn minimizes, the risk of possible imbalances and their time-consuming rectification. In addition, it allows for a single-unit module to be positioned and secured in a more simple manner than other modules, such as, for example, an additional rim, than would be the case with multi-component modules.

Furthermore, the primary plate may feature tangential friction surfaces, which can be arranged between the cut-outs of the primary plate. The term "tangential friction surfaces" is understood to mean the surface areas of the primary plate which feature at least one component in the circumferential direction, and are in frictional contact with a torque-absorbing module, such as the thrust piston of a spring arrangement.

Because of the combination of tangential friction surfaces and cut-outs with support areas, the primary plate is in a position to transfer outwards or accommodate the entire torque from the primary plate. This can be done in conjunction with thrust pistons, which are in contact with the tangential friction surfaces and in each case are pressed pair by pair apart from one another by springs and pressed against the support areas. The thrust pistons can be formed from a full injection molding or from a fibre-reinforced injection molding, and provided with ribs. With proper thrust piston material and a proper adjustment angle of the tangential friction surfaces in relation to the circumferential direction, the torsion vibration damper can be designed so that it is possible to do without a lubricant material in the area of the thrust pistons. This result means that potential sealing problems can be circumvented.

The primary plate can have a cylindrical shoulder area to provide a seal against the extrusion of grease at the primary plate of the spaces formed by the tangential friction surfaces and the cut-outs. A module, such as a sealing ring, may be secured to this shoulder area in a relatively uncomplicated manner.

The cylindrical shoulder area is designed as a flange. The sealing ring can be secured to the flange in a simple manner, such as by clipping on. In addition, a flange of this nature also allows additional modules, such as an additional rim to be secured to the primary plate, to be stabilized in the axial direction, such as parallel to the main axis of rotation of the torsion vibration damper.

It may be necessary for the primary plate in the cylindrical shoulder area to undergo subsequent shaping machining, such as metal-removing machining. This depends on the need for stability of the connection between the primary plate and the sealing ring. Subsequent machining, the primary plate may need to be clamped. This will not incur any change to the advantage provided by the primary plate towards minimizing the number of components and relatively easy manufacture.

To insure stability, the primary plate may be supported radially inwards on a central flange or shaft, e.g. the drive shaft of a motor. In this situation, it is necessary for subsequent forming machining to be undertaken of a radial internal part of the primary plate. Subsequent treatment does not create any impediment either in respect of the advantage according to the invention of the use of a primary plate, and can be reduced to the minimum degree necessary.

The invention is not restricted to the use of a plate in the narrower sense. Rather, any plate-type structure may serve as the primary plate, which has been rendered in the desired shape by machining. In this context, it is self-evident that the primary plate may in addition undergo additional processing stages, and processing stages which involve the removal of metal or of material.

In one forming stage, an angled area may be created at the primary plate which is arranged essentially parallel to the main axis of rotation of the torsion vibration damper. Angled areas provide direct stabilization of the primary plate. Furthermore, an additional rim may be brought in contact with these angled areas. This creates a relatively large contact area between the additional rim and the primary plate, which serves to provide further stabilization of the torsion vibration damper.

The side of the angled area which is turned away from the additional rim can be used as a tangential friction surface for the torque transfer or damping. It is also possible to provide for cut-outs in the angled areas which point radially inwards. In this context, it is possible in one work process to prepare the angled area to support the additional rim and the tangential friction surfaces and the support areas for the transfer of torque and for damping.

Therefore, there is increased stability in the preparation of an angled area on a plate of a torsion vibration damper which supports an additional rim, irrespective of its properties for transferring torque.

The additional rim, after being set on the angled area, can be crimped onto the primary plate by spot welding, or welded in spot fashion. This allows for a stable yet nevertheless sufficiently flexible connection to be established between the additional rim and the primary plate.

In addition, the arrangement described between the additional rim and the primary plate guarantees simple manufacture. Only the radial areas of the additional rim on the interior, coming in contact with the primary plate, requires a corresponding precision of fit. The same applies to the radial outer side of the angled areas of the primary plate. To this extent, this arrangement allows for a restriction to a minimum of the calibrated subsequent machining of the two modules prior to their assembly. This restriction is namely to the areas described. It is possible under certain circumstances to do entirely without metal-removing machining processes because of the certain amount of inherent elasticity of the primary plate, and, in particular, in the event of the crimping of the additional rim onto the primary plate.

The basic concept according to the invention of the functional separation between the torque transferring primary plate and the additional rim providing the torque makes it possible for the additional rim to be formed to create the most effective possible inertia plate. Accordingly, the additional rim, in particular in small numbers, can be a cast component, preferably made of cast steel. However, because the demands on the strength of the additional rim are not disproportionately high, the additional rim may also be made from elongate profile or flat steel. A semi-finished product of this nature is then bent and connected at its ends, welded for preference, to create the essentially cylindrical additional rim. This type manufacturing process for the additional rim is particularly well-suited for large numbers.

In this situation, it is possible for the flat steel to be shaped in the appropriate profile form as early as possible in the manufacturing stage. However, it is possible before, during and after bending, to carry out another forming process, such as cold forming.

In particular, the additional rim can also be calibrated after the connection of the two ends of the bent profile or flat steel, to facilitate bonding with the primary plate. In particular, this process stage may encompass removal material and cold pressing of the areas in contact with the angled area of the primary plate.

It is also possible to use a tube instead of the profile or flat steel, which is rolled accordingly and brought into the shape of a ring.

A starter gear rim can also be located radially on the outside of the additional rim. This is preferably applied before the calibrating machining of the additional rim, with the result that the module formed by this can be calibrated in one operational stage.

The structural separation between the starter gear rim and the additional rim allows the arrangement to be more simply manufactured. In addition, it allows for greater variability in adaptation to special customers' wishes. This is with regard to the torque value or the radius of the gear rim. To this extent it is evident that this structural separation can also be applied to advantage irrespective of the other features of the torsion vibration damper.

When the starter gear rim is being used the loading of the additional rim is not disproportionately high. This is because the forces transferred from the starter gear rim onto the additional rim are conducted directly onto the primary plate. In addition, the additional rim is supported by the gear rim and by the primary plate. To this extent, the arrangement of the starter gear rim on the additional rim does not impose any disproportionate demands on the stability and inherent strength of the additional rim. In addition, since a certain amount of torque must be transferred from the additional rim, it is possible for the arrangement of the additional rim described heretofore to be maintained.

To balance the primary plate in a simple manner there are appropriate milling cut-outs or boreholes in a radial surface area of the additional rim. This makes it possible to provide a simple cover plate, by means of the changes effected during balancing, such as milling cut-outs and drill holes. This can then be applied easily to the primary plate from one side, in an essentially ring-shaped design. Thus, the balancing procedures can also be carried out at other areas of the primary plate, and can be covered by the cover plate.

Drillholes or pins can be provided on the primary plates of torsion vibration dampers for signaling devices, to allow for a motor control system to determine the position of the torsion vibration damper and therefore of a crankshaft to drive it. In this context, holes provided in the additional rim have the disadvantage in that they influence the balancing of the primary plate. Holes provided in a side plate of the torsion vibration damper may, by contrast, cause problems with sealing. If pins are used instead of these, then additional space must be provided for them, and the risk arises that the projecting pins may lead to injury or undesirable contact with other objects.

To overcome these disadvantages, a generating element plate may be provided on the torsion vibration damper, located at the primary plate of the torsion vibration damper. This guarantees simple assembly of the arrangement as a whole; on the other, the overall arrangement can be adapted considerably more easily to individual customer requirements, since only the signal generating elements present on the generating element plate need to be adapted to the customers' wishes.

The generating element plate serves simultaneously as a cover plate for the procedures required to balance the primary plate, such as milling cut-outs and/or drillholes or additional rims fitted.

The generating element plate preferably features holes as the signal generating elements. This avoids the presence of any protruding modules and these holes do not have any disadvantageous effect on the other modules of the torsion vibration damper. They therefore, do not lead to any sealing problems, and have only an insubstantial influence on the balancing of the torsion vibration damper as a whole, due to the low plate thickness.

The generating element plate is secured to at least one essentially radial surface of the primary plate. This guarantees a relatively uncomplicated securing arrangement, and, no additional cut-outs or securing points are needed on the primary plate since radial surfaces of this nature are present by nature on rotating components which are not intended to feature any unnecessarily large axial extension.

In particular, the generating element plate can be secured both to a primary plate and to an additional rim of the primary plate. This guarantees a secure mounting for the generating element plate itself. In addition, the generating element plate can in serve to secure the additional rim to the primary plate. This type arrangement is advantageous if the additional rim is fixed in an axial direction by a flange of the primary plate. In this case, the fixing arrangement can be effected in the other axial direction by the generating element plate. Thus, this type arrangement is easy to manufacture, since only the additional rim needs to be mounted on the primary plate, and the securing of the additional rim can then already be effected by securing the generating element plate to the primary plate.

To facilitate the manufacture of a torsion vibration damper even further, radial cut-outs can be provided for in the secondary plate. These cut-outs increase to provide the resistance of the secondary plate against thermal load. Because torsion vibration dampers are frequently used in clutches, and clutch operations release relatively high amounts of thermal energy, the secondary plate is subject to relatively high thermal load. The radial cut-outs reduce the material stresses which arise during thermal loading of this nature. Thus, the result is that the secondary plate can be manufactured from a material which is less thermally sensitive. Such a material is, substantially simpler to process than high strength material which are highly heat-resistant. In particular, it is possible for a secondary plate to be manufactured from grey cast iron.

As radial cut-outs, cuts or depressions and similar shapes can be used, which are appropriate for reducing thermally-induced stresses. This relates in particular to material stresses which are incurred by thermal energies applied radially from the inside.

To accommodate thermal energies better, the invention further proposes a torsion vibration damper with a primary and secondary plate, mounted to move in rotation to one another by means of a slide bearing. This slide bearing comprises a sliding surface made of a polyamide, preferably PA 4.6 (stanyl). This material can, in particular, be varied and reinforced by supplements with regard to its sliding properties.

The temperature behavior of a torsion vibration damper with a primary plate and a secondary plate can be further improved by a sliding bearing between primary and secondary plate. This sliding bearing can have at least partially interrupted bearing sleeves in the circumferential direction. With an arrangement such as this, the bearing sleeves can expand in the circumferential direction, and as a result the bearings are subjected to less load.

Improved behavior under thermal stress is also featured by a torsion vibration damper with a primary plate and a secondary plate, which comprises a sliding bearing between the primary and secondary plates with bearing sleeves with longitudinal slots in the circumferential direction. This design provides improved behavior under thermal stress. In addition, this arrangement also has the advantage that the bearing sleeves consist of at least two part pieces arranged axially and fitted easily to one another, to form a module which is surrounded by the bearing sleeves.

The improved properties of the arrangements described under thermal stress make it possible for materials to be used for the bearing sleeves which have a relatively high thermal expansion. In this way, materials can be used which are especially easy to process or can be specially adapted to customers' needs.

In particular, the sliding bearing may encompass a sliding ring with an essentially L-shaped cross-section. A bearing sleeve such as this can be fitted relatively easily, since it can be laid in a corresponding groove. This sliding ring can also be made up of a sliding sleeve with an essentially cylindrical cross-section and a sliding disk directed in an essentially radial direction. This allows for greater freedom of the sliding ring under thermal expansion, and, a greater variability in the design of the sliding bearing, since the sliding sleeve and sliding disk can be made of different materials depending on the requirements.

The sliding ring with an essentially L-shaped cross-section guarantees a sliding bearing mounting in the radial direction as well as in an axial direction. For example, when this is not adequate, it is possible to provide a second sliding ring with an essentially L-shaped cross-section, which is arranged opposite the first sliding ring so that a sliding sleeve is created with an essentially U-shaped cross-section. By using two similar sliding rings, a bearing can be guaranteed between the primary and secondary plate s which is relatively economically priced and yet capable of sliding in both a radial as well as both axial directions. However, a sliding disk can be arranged essentially radially, so that a bearing sleeve is created which is essentially U-shaped. As a result, a sliding bearing is guaranteed in both the radial direction as well as in both axial directions. In addition, the sliding disk can also be formed from a material which differs from that of the sliding ring, which can be adapted at an economical price to be suitable for the stresses incurred at this point.

To increase the adaptability of a torsion vibration damper it can include a thrust piston spring arrangement for connecting the primary plate and the secondary plate. The thrust piston spring arrangement can encompass at least two thrust piston spring devices, which feature different spring damping characteristics. With small angles of rotation between the primary and secondary plates and with small torque values, the spring damping behavior of such a torsion vibration damper can be absorbed by one of the two thrust piston spring devices. In addition, with greater angles of rotation or torque values, it is predominately the properties of the second thrust piston spring device which apply. This allows for greater variability in adaptation to special customer wishes.

In this context, the two thrust piston spring devices can be connected in parallel or in series between the primary and secondary plates. With a series connection, this can be achieved by means of an intermediate module, which interacts with the first thrust piston spring device and, with the second thrust piston spring device. In addition, the first thrust piston spring device interacts with the primary plate, and the second thrust piston spring device interacts with the secondary plate.

Furthermore, at least one stop can be provided which prevents the compression of one of the thrust piston spring devices beyond a specific angle of rotation. This relates to the thrust piston spring device which responds to lower torque values, which in this way avoids unnecessary overloading. In this way the effect of this thrust piston spring device can be disconnected from a specific angle of rotation.

The stop can be provided for between the primary and secondary plate and the intermediate module. A stop of this nature can be fitted at any desired position of the torsion vibration damper, provided that it prevents, in the manner desired, any compression extending beyond a specific angle of rotation on the part of the corresponding thrust piston spring device.

It is also possible to design a torsion vibration damper according to the invention so that no grease is required in the areas in which the springs, and therefore also the thrust pistons, are arranged. This can be achieved because the materials for the thrust pistons are for the surfaces coming in contact with the thrust pistons and they are selected in a suitable manner. However, the effective angles between the thrust pistons and these surfaces can be designed in an appropriate manner. While at present setting angles of between 4 and 6° are used, these angles can be selected at over 10°. In this context, the term "setting angle" designates the effective wedge angle of the thrust piston between the two surfaces which take effect on it of the driving or driven modules respectively.

The thrust pistons may be made of plastic. In addition to this, inner ribs or similar devices may be provided for in the thrust pistons, with the result that they are not subjected to unnecessary material stresses. Other designs of the thrust pistons are also possible. This is to avoid having them being present as full bodies, and, for this reason, being subjected to internal material stresses.

This new type torsion vibration damper results in task specialization of the individual modules so as to guarantee a simpler and more economical creation of a torsion vibration damper with consistent or even improved quality. In this context, the invention provides for a torsion vibration damper in which a primary plate serves to transfer the torsion to a secondary plate. An additional rim guarantees an adequate torque value. In addition, a separate starter gear rim and a generating element plate are provided as a separate signal generation device. Here the secondary plate and its bearings allow for a direct connection to a heat-generating clutch, and this bearing can be adapted thanks to its great variability to suit the demands which arise. It is self-explanatory in this context that the invention is not restricted to the designation of specific modules as primary and secondary plates, but that its basic concept can be applied to advantage both with the driving as well as the driven modules of torsion vibration dampers.

BRIEF DESCRIPTION OF THE DRAWINGS

Other objects and features of the present invention will become apparent from the following detailed description considered in connection with the accompanying drawings which disclose several embodiments of the present invention. It should be understood, however, that the drawings are designed for the purpose of illustration only and not as a definition of the limits of the invention.

In the drawings wherein similar reference numerals denote similar elements throughout several views.

DETAILED DESCRIPTION OF THE PREFERRED EMBODIMENT

Figure 1:
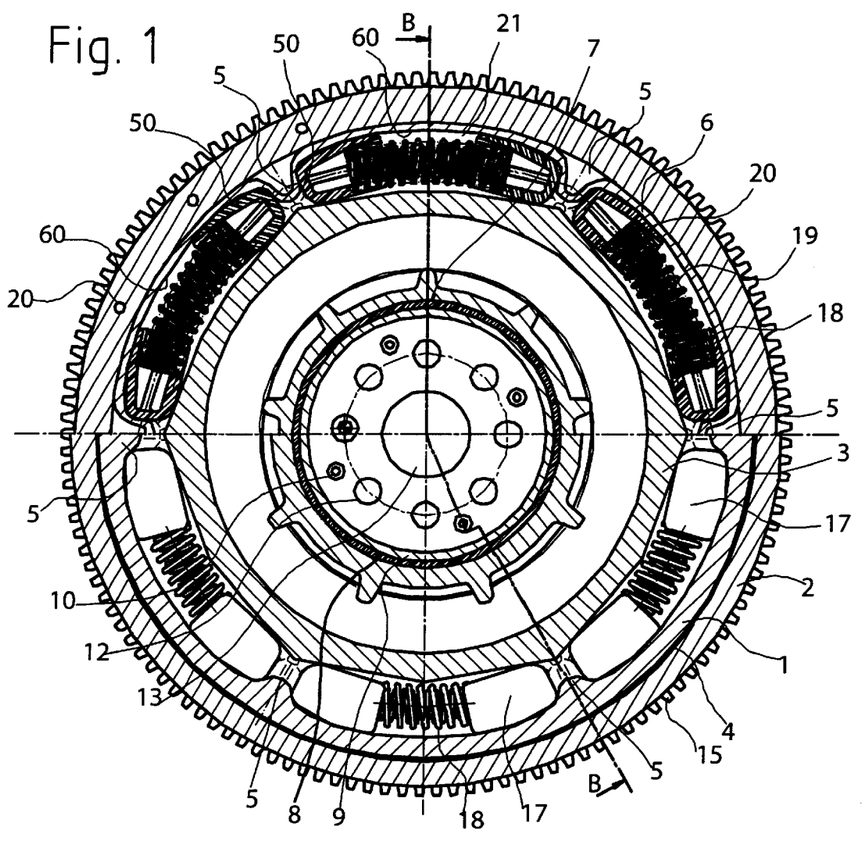
FIG. 1 is a cross sectional view of a torsion vibration damper according to the invention, taken along the line A—A of FIG. 2.

Referring to FIG. 1, there is shown a torsion vibration damper comprising a primary plate 1, which is secured to an additional rim 2, and a secondary plate 3, which is mounted so as to be rotational about primary plate 1. The bearing effect takes place in a U-shaped groove, which is formed by a central flange 9, essentially Z-shaped, and primary plate 1. Central flange 9 and primary plate 1 are secured to one another by pipe rivets 10 (identified by figures by way of example). In addition to this, primary plate 1 and central flange 9 feature drill holes 12, which serve to secure them to a shaft which passes through the central flange in a central aperture 13.

Figure 2:
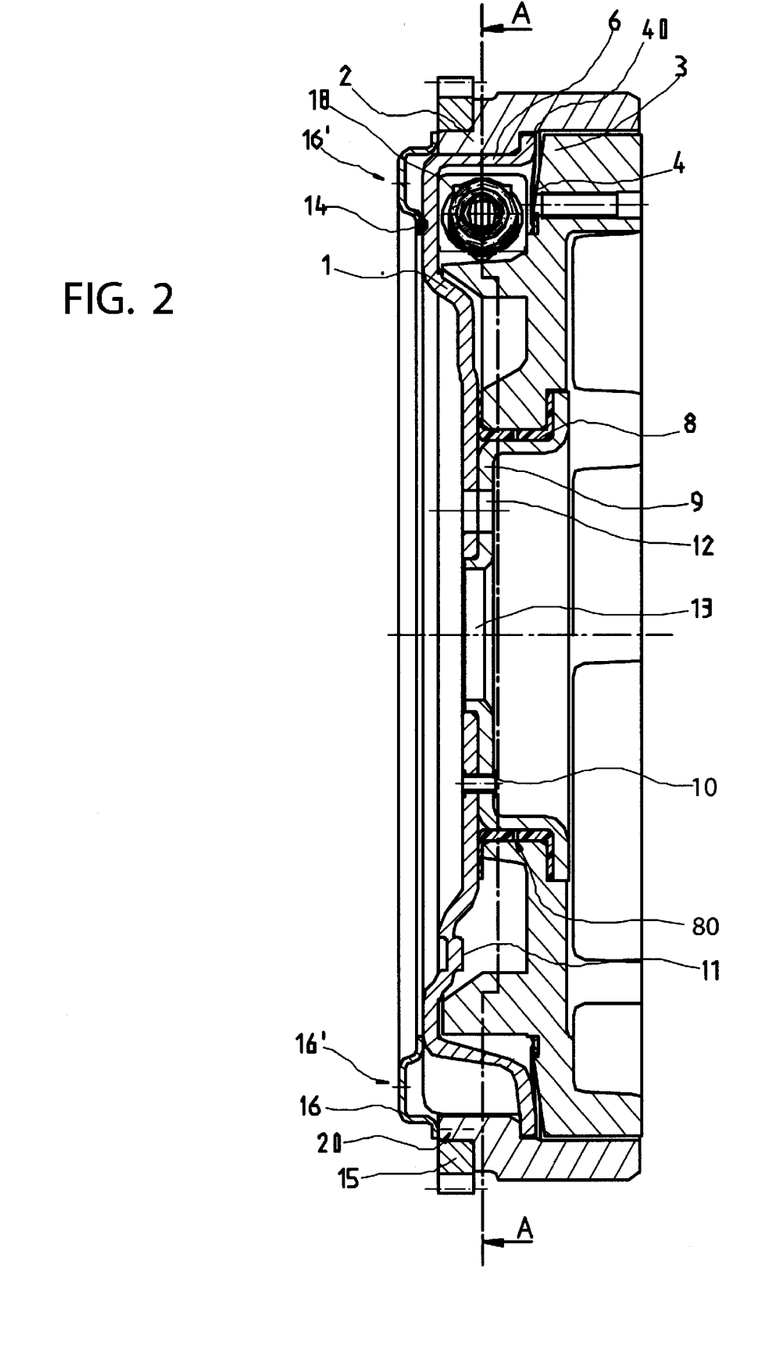
FIG. 2 is a cross sectional view of the torsion vibration damper of FIG. 1, along the line B—B in FIG. 1.
Figure 3:
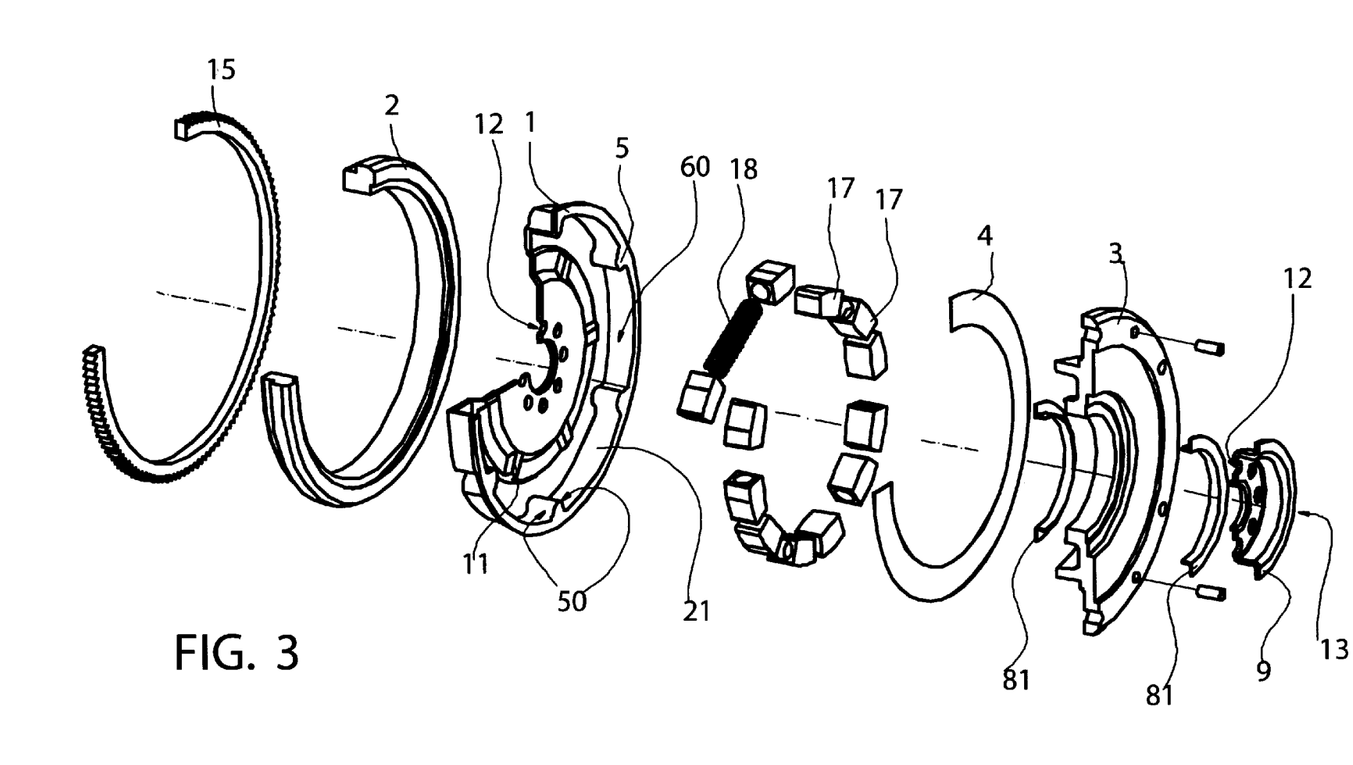
FIG. 3 shows the torsion vibration damper of FIG. 1 in an exploded view.

As shown in FIG. 2, primary plate 1 has an angled area 6 in which the additional rim is in contact radially on the exterior. The radially interior side of angled sections 6 form tangential friction surfaces 60, which are interrupted by cut-outs 5 of primary plate 1. These cut-outs 5 are support surfaces on the internal surface of plate 1. Cut-outs 5 run perpendicular to the circumference of the torsion vibration damper, and form opposed support surfaces 50 for engagement with thrust pistons 17. There are springs 18 disposed between each two thrust pistons 17. The areas or sections 6 form, spring chambers together with cut-outs 5 and the wall of secondary plate 3, which are filled with silicone grease. To seal the spring chambers, a seal 4 is provided, which is clipped to a flange 40 of primary plate 1, and encloses its cylindrical shoulder area.

Accordingly, primary plate 1 transfers a torque force onto secondary plate 3 by means of the tangential friction surfaces 60 and cut-outs 5. In addition, primary plate 1 features nose elements 11 (see FIG. 2), having a friction ring or similar device for additional damping. As shown on the basis of these noses 11 and cut-outs 5, the choice of a basic body in plate form is exceptionally well-suited to create a module which serves to transfer torque and provide damping in torsion vibration dampers.

In the present embodiment, additional rim 2 is crimped onto primary plate 1, onto angled area 6 of primary plate 1, indirectly fixed by spot welding. The direct fixing of additional rim 2 is effected by means of generating element plate 16, which in turn is connected with primary plate 1 by means of spot welds 14. As shown in particular from FIG. 2, the additional rim is therefore fixed not only by the frictional grip incurred by crimping it to flange 40 of primary plate 1, but also by generating element plate 16.

As can likewise be seen from FIG. 2, generating element plate 16 is secured to an essentially radial surface of primary plate 1. In addition, the generating element plate is supported on a radial surface of additional rim 2. As a result, it covers drill holes 20 in additional rim 2, and serves to balance the primary plate. Milling cut-outs may also be provided, instead of drill holes 30 which incur minor or no notch effect.

Generating element plate 16 features drill holes 16', which serve as signal generators for a position-dependent motor control device.

Primary plate 1 is manufactured by cold forming, as is central flange 9.

In this first embodiment, additional rim 2 is made from a profile steel element with the cross-section shown in FIG. 2. In this situation, a partial cut to the appropriate length is bent and welded at its ends. Next, the welding seams are removed, in a calibrated work stage, on the inside and in the area of the contact point of a starter gear rim 15. In a subsequent work stage, additional rim 2 is heated, so that it expands, and comes in contact with flange 40, with its essentially cylindrical inner surface area on angular section 6 of primary plate 1. Upon cooling, additional rim 2 shrinks and forms a friction connection with primary plate 1. Starter gear rim 15 is then brought into position, and the primary plate thus created is balanced.

Generating element plate 16 is then spot-welded to primary plate 1.

Figure 4:
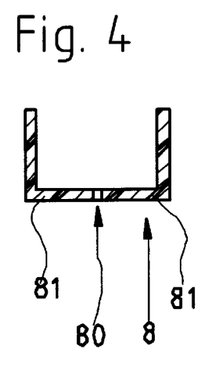
FIG. 4 shows the bearing sleeve of the torsion vibration damper of FIG. 1 in a sectional view.

Like the slot which accommodates the gyrating plate 3, as shown in FIG. 4, a bearing sleeve 8 or sliding bearing as shown in FIG. 4 has an essentially U-shaped cross-section. This is interrupted in the circumferential direction at the point 7 in FIG. 1. It also features a longitudinal slot 80 in the circumferential direction, and thus encompasses two sliding rings 81 with essentially L-shaped cross-sections. This guarantees that the bearing can be fitted relatively simply, in that the two sliding rings 81 are arranged on both sides of the secondary plate 3. There is also the possibility that bearing sleeve 8 can expand when heated.

The use of two sliding rings 81 of similar design also saves costs. Both sliding rings are made of slide-modified stanyl.

Figure 5:
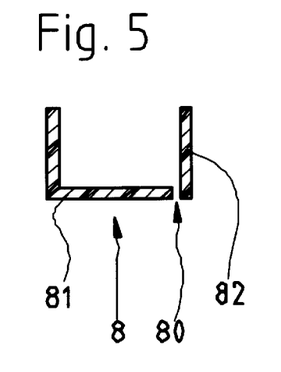
FIG. 5 shows a second bearing sleeve similar to FIG. 4.

The embodiment shown in FIG. 5 features only one sliding ring 81. Pointing towards the clutch (to the right in the drawing) is a sliding disk 82, which is made of non-skid modified stanyl. As a result, this bearing sleeve 8 can be manufactured relatively economically. Bearing sleeve 8 is taken from the lower load imposed on bearing sleeve 8 on the clutch side. Depending on the specific design, sliding disk 82 can be eliminated.

Figure 6:
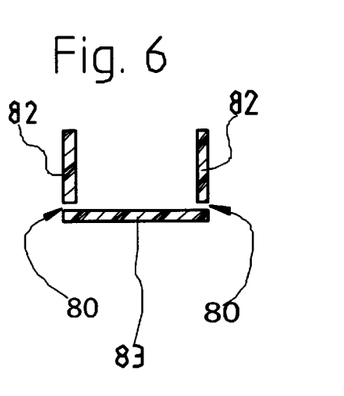
FIG. 6 shows a third bearing sleeve similar to FIG. 4.

Sliding ring 81 of the embodiment of FIG. 5 can also be replaced by a sliding sleeve 83 and an additional sliding disk 82, as shown in FIG. 6. As a result, there is still greater room in selecting the material. In addition, the possibility of thermal expansion are greater in this embodiment.

Figure 7:
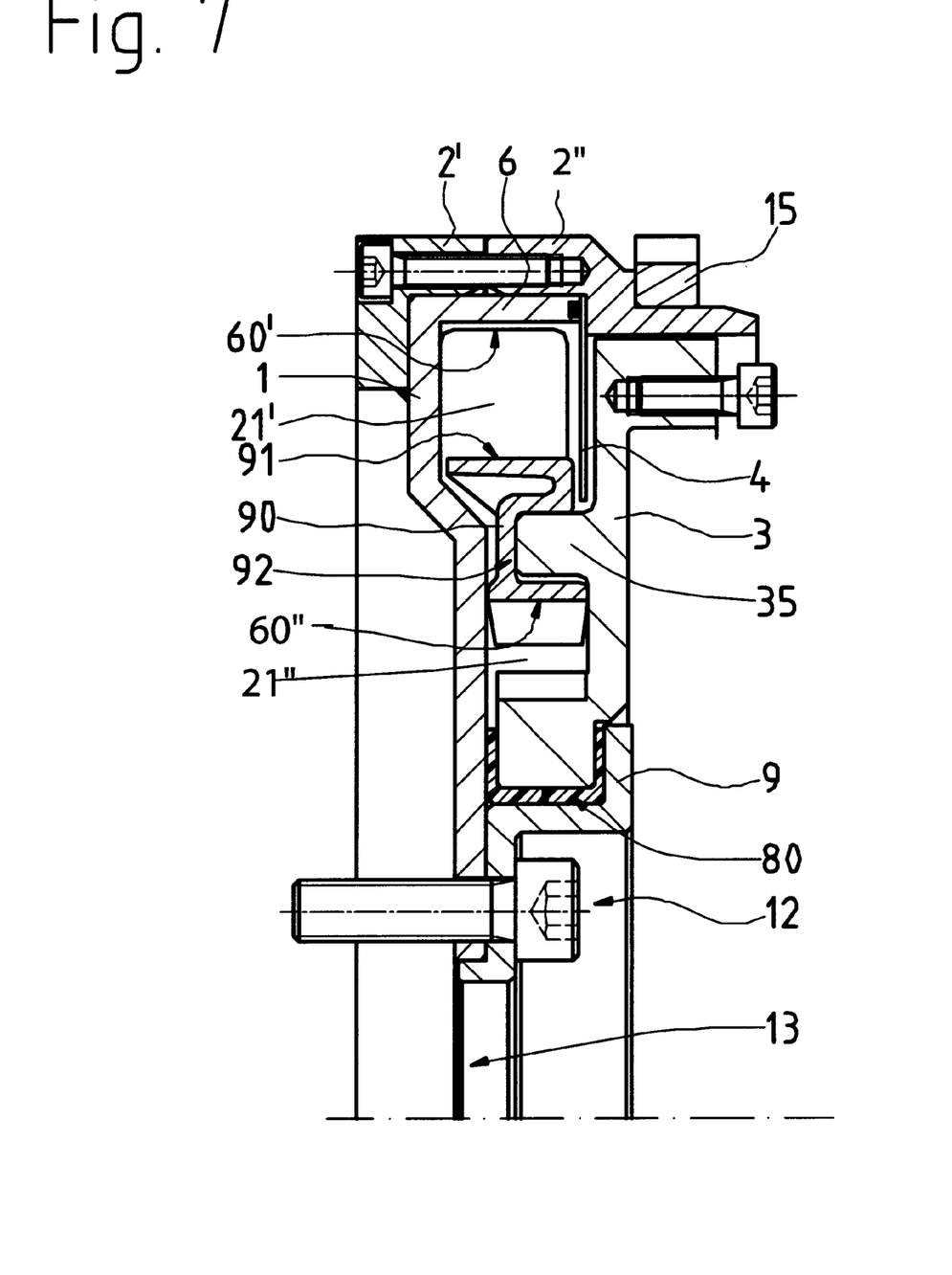
FIG. 7 shows a second embodiment of the torsion vibration damper similar to that of FIG. 2.
Figure 8:
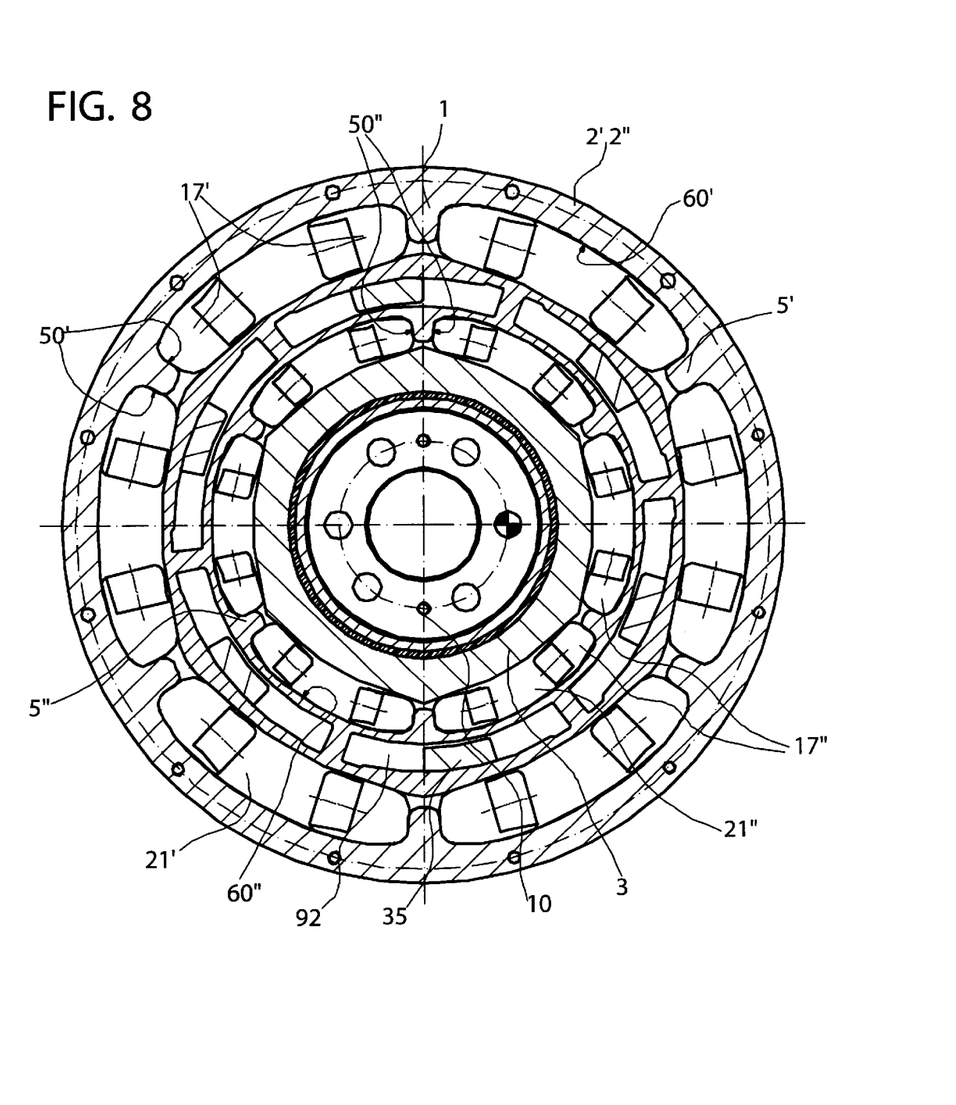
FIG. 8 shows the torsion vibration damper of FIG. 7 in a similar view as in FIG. 1.
Figure 9:
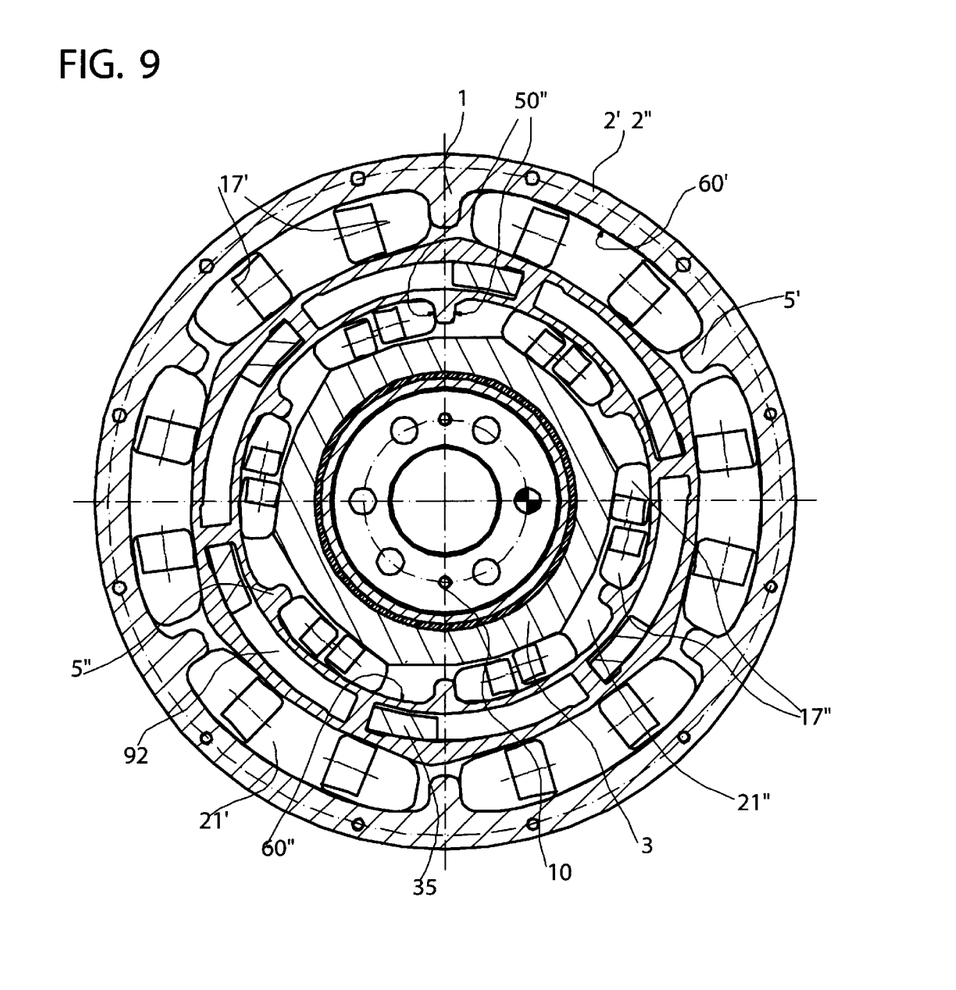
FIG. 9 shows the torsion vibration damper of FIGS. 7 and 8 in a similar view to FIG. 8, subjected to a torque load.

With the second embodiment shown in FIGS. 7 to 9, two thrust piston spring devices are connected in series, behind one another. In this situation, elements which perform the same function as in the first embodiment are provided with the same reference numbers, and elements which occur several times in terms of function are differentiated by dotted lines.

The torsion vibration damper shown in FIGS. 7 to 9 features a first thrust piston spring device, which encompasses thrust pistons 17'. Pistons 17 are arranged in spring chambers 21' of primary plate 1. This first thrust piston spring device interacts in turn with an intermediate module 90, and, in this embodiment, with an outer casing surface 91 of this intermediate module 90.

Intermediate module 90 in turn features spring chambers 21", in which additional thrust pistons 17" are arranged. These thrust pistons together with the corresponding springs 18 form a second thrust piston spring device. This thrust piston spring device in turn interacts with secondary plate 3, and, in this embodiment, likewise with a casing surface running in a circumferential direction.

Intermediate module 90 also encompasses cut-outs 92 into which noses 35 of secondary plate 3 engage. With a relative rotation between the secondary plate 3 and intermediate module 90, noses 35 come in contact at a specific angle of rotation at the edge of cut-outs 92. As a result, a stop is formed, which prevents a compression of the second thrust piston spring device beyond this specific angle of rotation. In this way, a torsion vibration damper is formed of which the spring damping characteristics which lie above the specific angle of rotation are absorbed by the first thrust piston spring device. As can be seen from FIG. 9 the behavior of the torsion vibration damper at angles of rotation below this specific angle of rotation are absorbed predominantly by the second, more strongly compressed thrust piston spring device.

Figure 10:
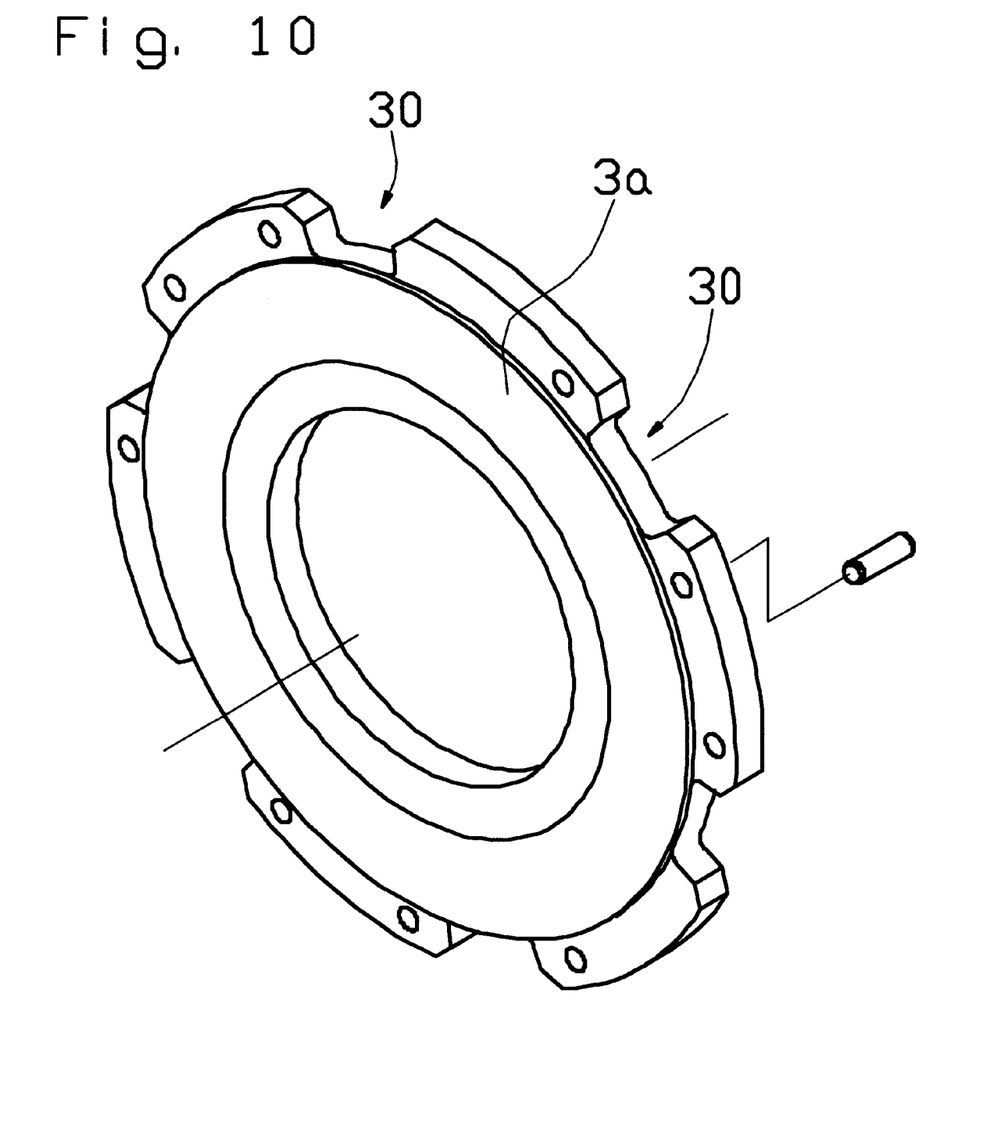
FIG. 10 A perspective schematic representation of a secondary plate according to the invention.

FIG. 10 shows a secondary plate variant 3a, capable of being used in both the first and the second embodiment, which features radial cut-outs 30. These cut-outs make it possible for thermal material stresses to be reduced so that secondary plate 3a can be manufactured relatively cheaply from grey cast iron.

Accordingly, while only a few embodiments of the present invention have been shown and described, it is to be understood that many changes and modifications may be made thereunto without departing from the spirit and scope of the invention as defined in the appended claims.

What is claimed is:

1. A torsion vibration damper comprising:
   a primary plate having a rim with an external surface and an internal surface and having a series of tangential friction surfaces; and
   a secondary plate disposed adjacent to said primary plate and coupled to said primary plate so that said primary plate transfers torque to said secondary plate.

2. The torsion vibration damper according to claim 1, further comprising an additional rim, wherein said primary plate is connected securely to said additional rim.

3. The torsion vibration damper according to claim 1, wherein said primary plate is shaped as a module which is symmetrical to the main axis of rotation of the torsion vibration damper.

4. A torsion vibration damper comprising:
   a primary plate having a first rim with an external surface and an internal surface;
   at least one additional rim disposed adjacent to said primary plate;
   a cylindrical shoulder area disposed on said primary plate facing said additional rim; and
   a secondary plate disposed adjacent to said primary plate and coupled to said secondary plate so that said primary plate transfers torque to said secondary plate.

5. The torsion vibration damper according to claim 1, wherein said primary plate is supported radially inwards on a central flange or a shaft.

6. The torsion vibration damper according to claim 1, wherein the tangential friction surfaces are disposed between cut-outs of said primary plate.

7. A torsion vibration damper comprising:
   a primary plate having a rim with an external surface and an internal surface and having a cylindrical shoulder area formed as a flange; and
   a secondary plate disposed adjacent to said primary plate and coupled to said primary plate so that said primary plate transfers torque to said secondary plate.

8. A torsion vibration damper comprising:
   a primary plate having a rim with an external surface and an internal surface wherein said primary plate has an angled area disposed essentially parallel to the axis of rotation of the torsion vibration damper and wherein said primary plate is formed from a pressing action;
   an additional rim which coupled to said primary plate in said angled area of said primary plate; and
   a secondary plate disposed adjacent to said primary plate wherein said primary plate transfers torque to said secondary plate.

9. The torsion vibration damper according to claim 8, wherein said additional rim is crimped onto said primary plate.

10. The torsion vibration damper according to claim 8, wherein the additional rim is connected to said primary plate by spot welding or welding point by point.

11. The torsion vibration damper according to claim 8, wherein the additional rim comprises a cast steel section.

12. The torsion vibration damper according to claim 8, wherein the additional rim comprises a profile or flat steel element, cut to length, bent, and joined at its ends.

13. The torsion vibration damper according to claim 8, wherein the ends of said profile or flat steel element are welded.

14. The torsion vibration damper according to claim 8, comprising a starter gear rim comprising an external gear secured to the circumference of said additional rim.

15. A torsion vibration damper comprising:
a primary plate having a rim with an external surface and an internal surface wherein said primary plate has an angled area disposed essentially parallel to the axis of rotation of the torsion vibration damper;
an additional rim connected to said primary plate in said angled area wherein said additional rim has drill holes or milling cut outs for balancing said primary plate; and
a secondary plate disposed adjacent to said primary plate and coupled to said primary plate so that said primary plate transfers torque to said secondary plate.

16. The torsion vibration damper according to claim 15, wherein said drill holes or milling cut-outs are disposed in a radial surface area of said additional rim.

17. A torsion vibration damper comprising:
a primary plate;
a secondary plate coupled to said primary plate;
a generating element plate located on said primary plate; and
an additional rim disposed on said primary plate, wherein said generating element plate is secured to both said primary plate and to said additional rim on said primary plate.

18. The torsion vibration damper according to claim 17, wherein said generating element plate features holes.

19. The torsion vibration damper according to claim 17, wherein said generating element plate is secured to at least one essentially radial surface of said primary plate.

20. The torsion vibration damper according to claim 17, wherein said generating element plate is ring shaped.

21. A torsion vibration damper comprising:
a primary plate having a series of spring chambers;
a series of springs disposed in said spring chambers;
a secondary plate disposed adjacent to said primary plate and coupled to said primary plate; and
a sliding bearing disposed radially inwards of said series of springs between said primary and secondary plates having a sliding surface of polyamide, such as PA 4.6.

22. The torsion vibration damper according to claim 21, wherein said sliding bearing comprises a sliding ring with an essentially L-shaped cross-section.

23. The torsion vibration damper according to claim 22, wherein said sliding ring comprises a sliding sleeve and a sliding disk.

24. The torsion vibration damper according to claim 22, wherein said sliding bearing comprises two sliding rings with essentially L-shaped cross-sections, to form a bearing sleeve having an essentially U-shaped cross-section.

25. The torsion vibration damper according to claim 22, wherein said sliding bearing comprises a sliding disk and sliding ring wherein said sliding disk defines a bearing sleeve with an essentially U-shaped cross-section.

26. A torsion vibration damper comprising:
a primary plate having a series of spring chambers;
a series of springs disposed within said spring chambers;
a secondary plate disposed adjacent to said primary plate and coupled to said primary plate; and
a sliding bearing disposed radially inwards of said series of springs between said primary and said secondary plate, having at least partially interrupted bearing sleeves in said secondary plate's circumference.

27. A torsion vibration damper comprising:
a primary plate having a series of spring chambers;
a series of springs disposed within said spring chambers;
a secondary plate disposed adjacent to said primary plate and coupled to said primary plate; and
a sliding bearing disposed radially inwards of said series of springs between said primary and said secondary plates with said sliding bearing having bearing sleeves having longitudinal slots disposed along its circumference.

28. A torsion vibration damper comprising:
a primary plate having a first series of spring chambers;
a secondary plate disposed adjacent to said primary plate and coupled to said primary plate;
an intermediate module disposed between and in contact with said primary plate and said secondary plate said intermediate module having a second series of spring chambers; and
a thrust piston spring arrangement comprising at least a first thrust piston spring device disposed in said first series of spring chambers and at least a second thrust piston spring device, disposed in said second series of spring chambers wherein said first thrust piston spring device has different spring damping characteristics than said second thrust piston spring device, said thrust piston spring arrangement for causing the interaction between said primary plate and said secondary plate at all angles except for at an equilibrium angle.

29. The torsion vibration damper according to claim 28, wherein said intermediate module interacts with said first thrust piston spring device while said first thrust piston spring device interacts with said primary plate and said second thrust piston spring device interacts with said secondary plate.

30. The torsion vibration damper according to claim 28, further comprising at least one stop which prevents a compression of said thrust piston spring device beyond a specific angle of rotation.

31. The torsion vibration damper according to claim 15 wherein said drill holes or milling cut-outs are formed beneath a cover plate.

* * * * *

UNITED STATES PATENT AND TRADEMARK OFFICE
CERTIFICATE OF CORRECTION

PATENT NO.    : 6,364,775 B1                                    Page 1 of 1
DATED         : April 2, 2002
INVENTOR(S)   : Rohs et al.

It is certified that error appears in the above-identified patent and that said Letters Patent is hereby corrected as shown below:

<u>Title page,</u>
Item [73], the name of the assignee correctly should read:
-- Rohs-Voigt Patentverwertungsgesellschaft mbH --.

Signed and Sealed this

Twenty-second Day of October, 2002

*Attest:*

JAMES E. ROGAN
*Attesting Officer*          *Director of the United States Patent and Trademark Office*